United States Patent [19]

Bamler et al.

[11] Patent Number: 5,237,329
[45] Date of Patent: Aug. 17, 1993

[54] METHOD OF CORRECTING RANGE MIGRATION IN IMAGE GENERATION IN SYNTHETIC APERTURE RADAR

[75] Inventors: Richard Bamler, Gilching; Hartmut Runge, Seefeld, both of Fed. Rep. of Germany

[73] Assignee: Deutsche Forschungsanstalt fur Luft- und Raumfahrt e.V., Cologne, Fed. Rep. of Germany

[21] Appl. No.: 909,843

[22] Filed: Jul. 7, 1992

[30] Foreign Application Priority Data

Jul. 8, 1991 [DE] Fed. Rep. of Germany ....... 4122592

[51] Int. Cl.⁵ ............................................. G01S 13/90
[52] U.S. Cl. ...................................... 342/25; 342/196
[58] Field of Search ........................... 342/25, 195, 196

[56] References Cited

U.S. PATENT DOCUMENTS

| | | | |
|---|---|---|---|
| 4,132,989 | 1/1979 | Arens | 342/25 |
| 4,292,634 | 9/1981 | Wu et al. | 342/25 |
| 4,355,311 | 10/1982 | Jain | 342/25 |
| 4,471,357 | 9/1984 | Wu et al. | 342/25 |
| 4,594,593 | 6/1986 | Nohmi | 342/25 |
| 4,616,227 | 10/1986 | Homma et al. | 342/25 |
| 4,758,838 | 7/1988 | Maeda et al. | 342/25 |
| 4,866,448 | 9/1989 | Rocca et al. | 342/25 |
| 4,879,559 | 11/1989 | Arambepola | 342/25 |
| 4,910,520 | 3/1990 | Rosen et al. | 342/25 |
| 4,924,229 | 5/1990 | Eichel et al. | 342/25 |
| 4,967,200 | 10/1990 | Arambepola | 342/25 |
| 4,985,704 | 1/1991 | Smith | 342/25 |
| 4,999,635 | 3/1991 | Niho | 342/25 |
| 5,043,734 | 8/1991 | Niho | 342/25 |
| 5,122,803 | 6/1992 | Stann et al. | 342/25 |
| 5,170,170 | 12/1992 | Soumekh | 342/179 |
| 5,179,383 | 1/1993 | Raney et al. | 342/25 |
| 5,184,133 | 2/1993 | Tsao | 342/25 |
| 5,184,134 | 2/1993 | Niho et al. | 342/25 |

OTHER PUBLICATIONS

Wu, Chialin, Liu, K. Y., Jin, Michael: "Modeling and a Correlation Algorithm for Spaceborne SAR Signals" in IEEEY Transactions on Aerospace and Electronic Systems, vol. AES-18, No. 5, Sep. 1982, pp. 563-575.

*Primary Examiner*—John B. Sotomayor
*Attorney, Agent, or Firm*—Browdy and Neimark

[57] ABSTRACT

In a method for correcting range migration in image generation in synthetic aperture radar (SAR) to eliminate the entire range migration or the residual range migration left by a conventional focussing method, prior to the range compression the data are transformed to the range-Doppler domain and there multiplied by a specific two-dimensional phase function; after an additional range Fourier transformatioin the range compression is then carried out with a specifically modified range transfer function and thereafter a range inverse Fourier transformation performed. Furthermore, a corresponding residual phase error is corrected. In addition, the data can if necessary be segmented in range or a range precompression performed.

With the method according to the invention the range migration is completely eliminated without having to perform an explicit interpolation. Furthermore, with reduced processing expenditure improved image quality is obtained and moreover all known SAR focussing methods can be equipped with the method according to the invention.

3 Claims, 3 Drawing Sheets

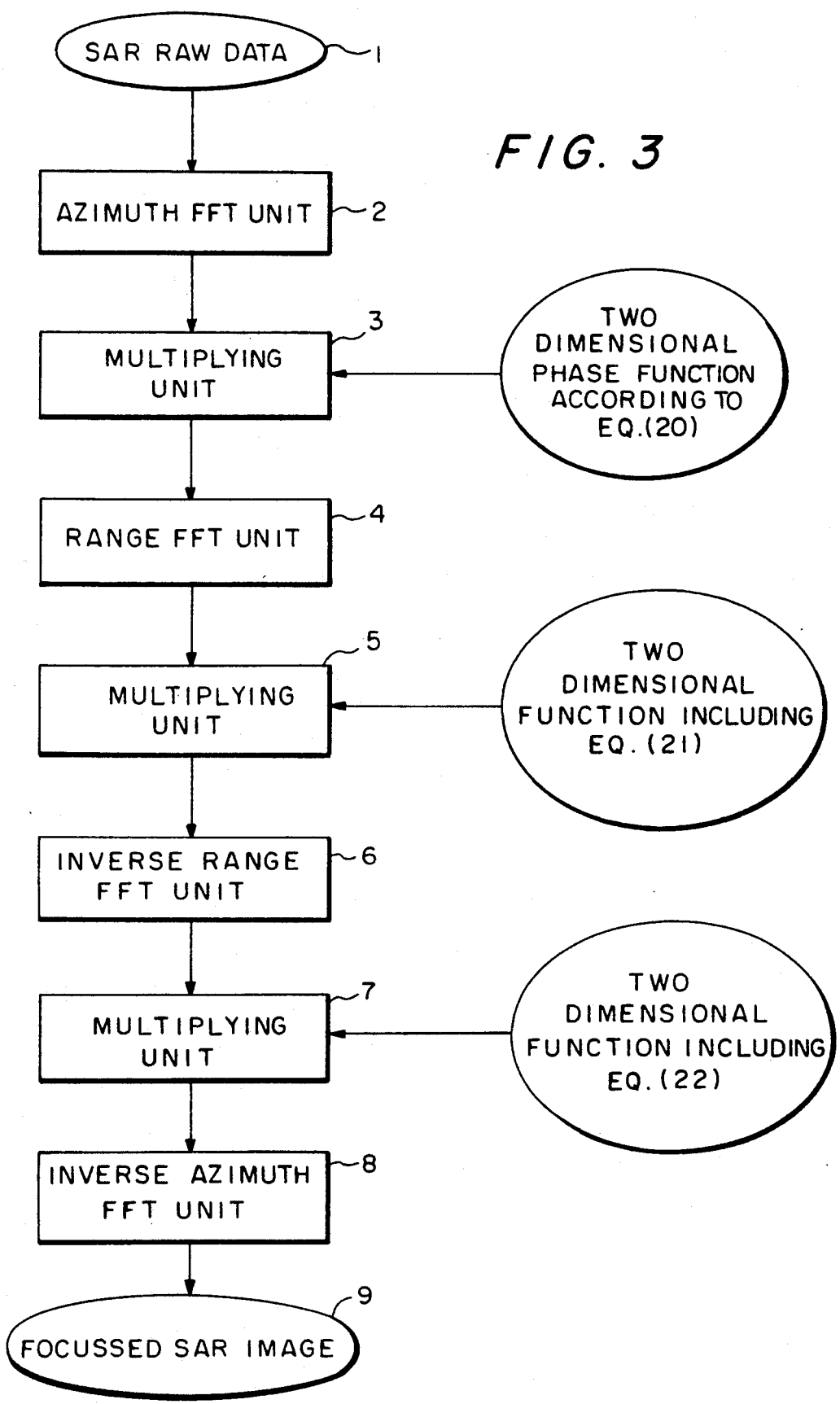

METHOD OF CORRECTING RANGE MIGRATION IN IMAGE GENERATION IN SYNTHETIC APERTURE RADAR

BACKGROUND OF THE INVENTION

1. Field of the Invention

The invention relates to a method of correcting range migration (RM) in image generation in synthetic aperture radar.

2. Description of the Prior Art

Synthetic aperture radar (SAR) is an active microwave imaging method. A radar transmitting-receiving apparatus usually carried by an aircraft or satellite coherently records the echoes of high-frequency signals transmitted with a pulse repetition frequency (PRF). The antenna centre axis is usually aligned approximately perpendicularly to the trajectory.

FIG. 1 shows schematically how an individual point P in the scene to be imaged is acquired during the flyby of a sensor S. It will be assumed that the point P at the time $t=0$ has a minimum distance r from the sensor S. If a transmitted pulse is denoted in each case by $$p(\tau) \cdot \exp\{j \cdot \omega_0 \cdot \tau\}, \tag{1}$$

wherein $p(\tau)$ is the complex envelope and $\omega_0$ the radar carrier frequency, then the received echo at a predetermined instant t is a time-delayed version of said pulse:

$$p\left(\tau - \frac{2}{c} \cdot R(t;r)\right) \cdot \exp\left\{j \cdot \omega_0 \cdot \left(\tau - \frac{2}{c} \cdot R(t;r)\right)\right\} \tag{2}$$

wherein c is the velocity of light and R(t;r) the respective distance of the point P from the sensor S. In the simplified geometry of FIG. 1 R(t;r) has the following functional form:

$$R(t;r) = \sqrt{r^2 + v^2 \cdot t^2} \approx r + \frac{v^2 \cdot t^2}{2 \cdot r}, \tag{3}$$

wherein the velocity of the sensor S is denoted by v. The echoes received are coherently demodulated in the sensor S, i.e. the carrier frequency is eliminated. The point response of the SAR sensor is thus $$p\left(\tau - \frac{2}{c} \cdot R(t;r)\right) \cdot \exp\left\{-j \cdot \frac{4\pi}{\lambda} \cdot R(t;r)\right\}, \tag{4}$$

wherein $\lambda = 2\pi c/\omega_0$ is the radar wavelength.

These echoes are usually digitized and stored in a socalled raw data matrix. For example, the column direction corresponds to the echo travelling time $\tau$ (frequently also denoted as "range") and the row direction is the flight time t (also referred to as "azimuth").

The conversion of these raw data to a high-resolution image of the radar backscatter coefficients of the earth's surface is referred to as "focussing" or "compression" and today is usually carried out by special hardware or alternatively by digital computers, the socalled "SAR processors". This compression can be performed by correlation of the raw data with the point response given in equation (4). A direct implementation of this correlation in the time domain requires very intensive computations because the correlation kernel is both two-dimensional and range-dependent. From the argument of the impulse envelope p(.) in equation (4) it is clear that the echoes occur with varying time t at respective different echo times $$\tau = \frac{2}{c} \cdot R(t;r) \tag{5}$$

This effect is referred to as "range migration" (RM). Both the range migration and the phase term in equation (4) are range-dependent.

To carry out the compression more effectively as regards computing time, different frequency domain methods are employed. In the area of precision processing two methods are established: The socalled "range-Doppler" method, described inter alia by J. R. Bennett and I. G. Cumming in the publication "A Digital Processor for the Production of SEASAT Synthetic Aperture Radar Imgery" ESA-SP-154, December 1979 and the socalled "Wavenumber domain" processor, described by F. Rocca, C. Prati and A. Monti Guarnieri in the report "New Algorithms for Processing SAR Data", Esrin Contract 7998/88/F/FL(SC), 1989. A description and a comparison of these two methods will be found in "A Systematic Comparison of SAR Focussing Algorithms" by R. Bamler, in: Proc. IGARSS'91, pages 1005–1009, 1991.

The range-Doppler method is aimed at eliminating the effect of the RM so as to enable the correlation to be carried out thereafter only along straight lines $\tau$=const. with the aid of a fast convolution (FFT). The latter operation is referred to as "azimuth compression". The RM correction here is carried out in the socalled range-Doppler domain which is formed by Fourier transformation of the raw data in the azimuth direction. The frequency f occurring here and corresponding to t is referred to as "Doppler frequency". The RM correction in the range-Doppler domain is possible because the echo energy in the range-Doppler domain is likewise concentrated along a curved line:

$$\tau = r \cdot \frac{2}{c} \cdot (1 + a(f)). \tag{6}$$

The function a(f) can be determined with the aid of the approximation of the stationary phase. For the quadratic approximation of R(t;r) in equation (3) the following is for example obtained:

$$a(f) = \frac{\lambda^2}{8} \cdot \frac{f^2}{v^2} \tag{7}$$

The range migration correction is done by range-variant shift along the negative $\tau$ direction by the amount:

$$\Delta\tau = r \cdot \frac{2}{c} \cdot a(f), \tag{8}$$

so that the entire echo energy is concentrated in the straight line $\tau = 2.r/c =$ const.

In FIG. 2 range migration lines of three points each with a minimum distance $r_1$, $r_2$ and $r_3$ respectively, from the sensor and the straight lines $\tau = 2.r_{1,2,3}/c$ are given; in FIG. 2 the abscissa represents the Doppler frequency f and the ordinate the range time $\tau$. The shifts $\Delta\tau$ for a frequency f are also entered.

The shift distance is not generally an integer multiple of the range sampling interval. Consequently, the data must be interpolated in the range direction. This is an operation requiring a great deal of computing time and with the usually employed short interpolation kernels can lead to disturbances in the image.

To avoid the interpolation in the range-Doppler method it is possible to shift each range column completely by an amount corresponding to an integer multiple of the range sampling interval. This can be done by simple reindexing of the sample values. In this case an uncompensated range migration remains of magnitude:

$$\Delta\tau = (r - \bar{r}) \cdot \frac{2}{c} \cdot a(f), \tag{9}$$

wherein $\bar{r}$ is the value of r for which the range migration was just completely corrected.

In the wavenumber domain processor, firstly a two-dimensional range-invariant correlation is carried out utilizing the FFT, the range parameter r in equation (4) being assumed to be $r = r_0 =$ const. Thereafter, or optionally therebefore, the range variance of the correlation kernel is taken into account in that the phase term in equation (4) is corrected for each range sample value. Thus, with this procedure the range migration is exactly corrected only for $r = r_0$, for example in the centre of the range swath; towards the edge of the range domain a residual range migration remains.

In a publication by K. Raney and B. Vachon "A Phase Preserving SAR Processor" in: Proc. IGARSS'89, pages 2588-2591, 1989, in which an improvement of the wavenumber domain processor is proposed, this residual range migration in the range-Doppler domain is eliminated by a shift similar to that in the range-Doppler method; this can however lead to the already mentioned interpolation problems. In the range-Doppler domain the residual shift to be performed is given by:

$$\Delta\tau = (r - r_0) \cdot \frac{2}{c} \cdot a(f) \tag{10}$$

In the publication by Rocca et al. mentioned at the beginning a wavenumber domain processor is proposed in which the range migration is completely corrected. For this purpose a socalled "Stolt interpolation" must be applied to the two-dimensional Fourier transform of the data. However, this interpolation impairs the image quality even more than the range migration correction in the range-Doppler domain.

In the SAR focussing methods hitherto employed the range migration is either not completely corrected or an explicit interpolation is carried out. The latter requires a great deal of computing time and can lead to disturbances in the focussed image.

The invention has its objective in the provision of a method for avoiding the aforementioned difficulties and providing a method for the correction of residual correction of range migration in image generation in synthetic aperture radar without carrying out an explicit interpolation of the data.

The invention therefore proposes a method for correcting range migration in image generation in synthetic aperture radar the improvement in which the eliminating the entire range migration, which in the range-Doppler domain is described by $$\Delta\tau = a(f) \cdot \frac{2}{c} \cdot r$$

wherein $\Delta\tau$ is the desired echo time shift, r the minimum distance of a point from the radar and f the azimuth (Doppler) frequency, a residual range migration which is left by a focussing means and is described by $$\Delta\tau = a(f) \cdot \left( \frac{2}{c} \cdot r - \tau' \right)$$

wherein $\tau'$ is any desired reference echo time, or for carrying out a Stolt interpolation before a range compression the acquired SAR raw data are transformed in an azimuth FFT unit to the range-Doppler domain; thereafter the data transformed to the range-Doppler domain are subjected in a multiplying unit to a multiplication by a two-dimensional phase function $$\exp\{j \cdot \pi \cdot k \cdot a(f) \cdot (\tau - \tau')^2\}$$

wherein k is the frequency modulation rate of a chirp pulse transmitted by the radar and $\tau$ the echo travelling time: after an additional range Fourier transformation on the azimuth-transformed data in a second multiplying unit a range compression is carried out with a modified range transfer function $$\exp\left\{ j \cdot \pi \cdot \frac{1}{1 + a(f)} \cdot \frac{v^2}{k} \right\}$$

wherein $v$ is the range frequency corresponding to the echo travelling time $\tau$, and finally with data transformed back to the range-Doppler domain by means of an inverse range FFT unit in a further multiplying unit a phase error is corrected by multiplication by the function $$\exp\{-j \cdot \pi \cdot a(f) \cdot (1 + a(f)) \cdot k \cdot (\tau - \tau')^2\}$$

Advantageous further developments of the method according to the invention are set forth in the subsidiary claims.

BRIEF DESCRIPTION OF THE DRAWINGS

Hereinafter the invention will be explained in detail with reference to a preferred embodiment with the aid of the attached drawings, wherein:

FIG. 3 shows in the form of a block diagram an apparatus for carrying out the method according to the invention.

DESCRIPTION OF THE PREFERRED EMBODIMENT

Figure 1:
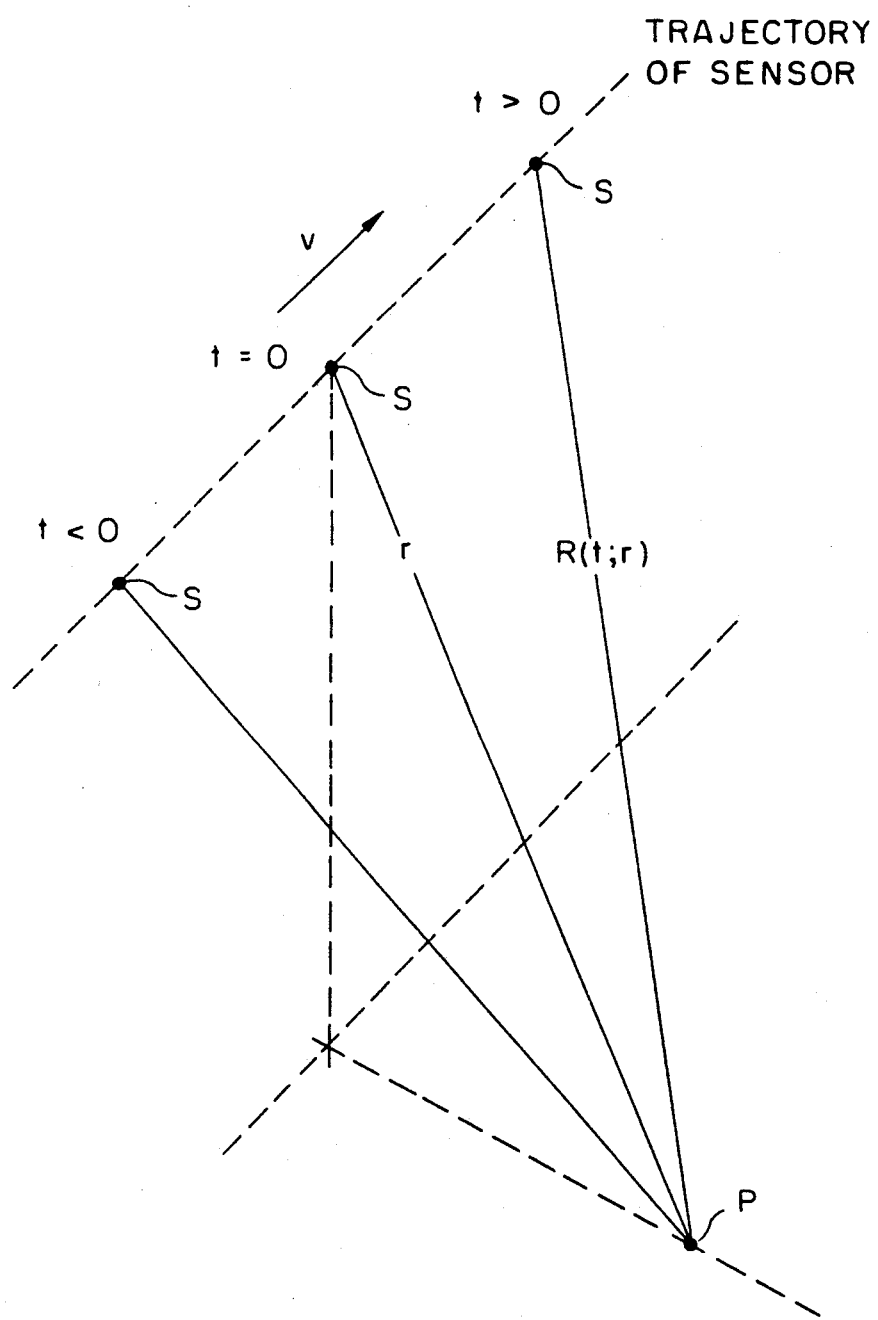
FIG. 1 shows a data acquisition geometry of a SAR system having a distance varying with time between a sensor orbiting the earth on a trajectory and a point on the earth.
Figure 2:
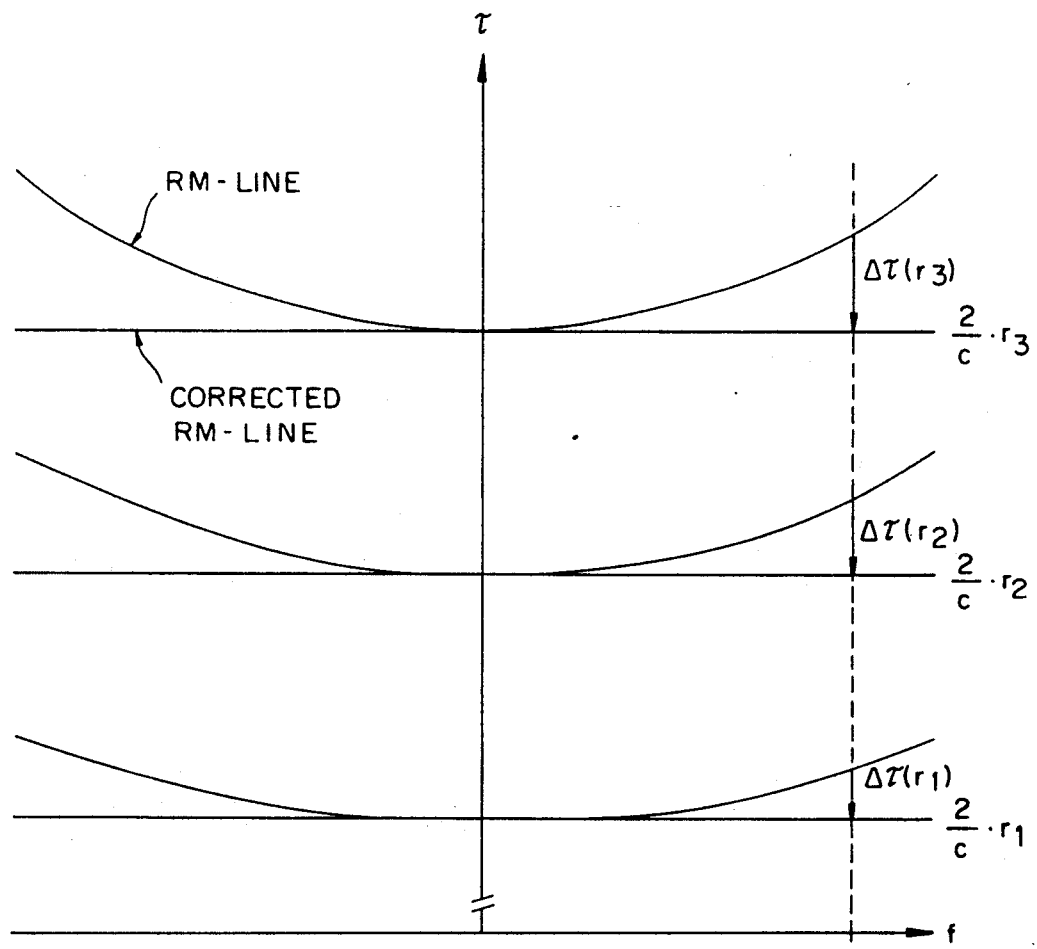
FIG. 2 shows the correction of the range migration lines by a shift in the range-Doppler domain three points with different ranges.

Thus, with the method according to the invention a frequency- and range-dependent shift or residual shift in the range direction is carried out in the form represented by the following equation (11):

$$\Delta\tau = a(f) \cdot \left(\frac{2}{c} \cdot r - \tau'\right) \quad (11)$$

wherein $\tau'$ is defined as follows corresponding to equations (8), (9) and (10) depending on the focussing algorithm used:

$$\tau' = 0 \quad (12)$$

$$\tau' = \frac{2}{c} \cdot r \quad (13)$$

$$\tau' = \frac{2}{c} \cdot r_0. \quad (14)$$

In the method according to the invention the specific form of the complex envelope $p(\tau)$ of the transmitted pulses is employed. In almost all known SAR systems $p(\tau)$ has the form of a quadratic phase function which is also referred to as range chirp:

$$p(\tau) = \exp\{j \cdot \pi \cdot k \cdot \tau^2\} \text{ for } |\tau| \leq \tau_p 2, \quad (15)$$

wherein k is the socalled "frequency modulation (FM) rate" and $\tau_p$ the duration of the pulses. With the SAR processors usually employed the raw data are crosscorrelated with the range chirp in a first processing step, the range compression.

With this pulse compression a resolution is achieved in the range direction which is several orders of magnitude better than that defined by $\tau_p$.

By a pulse compression, in the raw data matrix for a point P at a distance R from the sensor S (FIG. 1) a narrow (sin x)/x-shaped pulse results at $\tau = 2 \cdot R/c$.

In the method according to the invention the data are transformed to the range-Doppler domain before a range compression by an azimuth FFT in order to carry out in this domain a corresponding phase manipulation so that with the aid of a subsequent range compression a shift of the correlation pulse in the sense of the desired range migration correction takes place. In an article "A Novel Method for Range Migration Correction for SAR" by H. Runge and R. Bamler, in Proc. IGARSS'91, page 1435, this is roughly outlined without specifying the phase functions absolutely essential and indispensible for implementation.

In the method according to the invention the following specific correlation property of chirp functions is utilized: The echo of a point P at a distance R from the sensor has in the raw data the form:

$$\exp\left\{j \cdot \pi \cdot k \cdot \left(\tau - \frac{2}{c} \cdot R\right)^2\right\} \cdot \exp\left(-j \cdot \frac{4\pi}{\lambda} \cdot R\right) \quad (16)$$

After a correlation with the transmitted chirp according to equation (15) a pulse appears to $$\tau = \frac{2}{c} \cdot R. \quad (17)$$

If however the received chirp is multiplied before range compression by a linear phase function of the form $$\exp\{j \cdot 2\pi \cdot b \cdot \tau\} \quad (18)$$

wherein b is an arbitrary frequency, then the correlation maximum is shifted to the point $$\tau = \frac{2}{c} \cdot R - \frac{b}{k}. \quad (19)$$

For utilization of this effect for a range migration correction, however, it must be remembered that the desired shift according to equations (11) and (12) to (14) varies in the range direction. The parameter b must therefore be adjusted over the range. Since the desired shifts for range migration correction are strictly linearly dependent on the range, the phase function assumes a quadratic form.

Only because the multiplication of this phase function is carried out in the range-Doppler domain the shift can be made dependent on the frequency f as required for exact range migration correction.

An apparatus for carrying out the method will be described with the aid of a block diagram in FIG. 3.

Acquired SAR raw data 1 are Fourier transformed in an azimuth FFT unit 2 in the azimuth direction and are thereby brought into the range-Doppler domain. In a multiplying unit 3 the data Fourier-transformed in the unit 2 are multiplied by a phase function quadratically varying with range of the form $$\exp\{j \cdot \pi \cdot k \cdot a(f) \cdot (\tau - \tau')^2\} \quad (20)$$

The function according to equation (20) depends on the two variables f and $\tau$. As already described above, an integer image element shift can be eliminated by reindexing prior to this operation.

In a range FFT unit 4 the data obtained from the multiplying unit 3 are additionally range-Fourier transformed, where a frequency variable corresponding to the time $\tau$ is denoted by $\nu$. The data at the output of the range FFT unit 4 are multiplied in a second multiplying unit 5 by a two-dimensional filter function which is made up of two components, i.e.

a) a filter function dependent on the focussing algorithm employed, for example the two-dimensional transfer function required in the "wavenumber domain processor" and possible window functions which are not influenced by the method according to the invention, and b) a two-dimensional phase function of the form:

$$\exp\left(j \cdot \pi \cdot \frac{1}{1 + a(f)} \cdot \frac{\nu^2}{k}\right) \quad (21)$$

by means of which the range compression is performed. This filter function contains a correction which compensates the effect that the FM rate of the chirps in the data was also altered by the quadratic phase function in the multiplying unit 3. Optionally, a correspondingly modified spectrum of the actually transmitted range chirp may be employed if it is available. In an inverse range FFT unit 6 the data at the output of the second multiplying unit 5 are transformed back to the range-Doppler domain, the range migration correction thereby already being performed. However, a residual phase error due to the method according to the invention is still present in the data to the output of the inverse range FFT unit 6.

In a further multiplying unit 7 a two-dimensional function is multiplied to the output data of the inverse range FFT unit 6 and is in turn made up of two multiplicative components, i.e.

a) a transfer function dependent on the focussing algorithm, for example the azimuth reference function in the range-Doppler method or the socalled residual focussing function in the wavenumber domain processor (this procedure again not being affected by the present method !), and b) a correction of the said residual phase error:

$$\exp\{-j \cdot \pi \cdot a(f) \cdot (1+a(f)) \cdot k \cdot (\tau-\tau'^2\} \qquad (22)$$

The output data of the multiplying unit 7 are supplied to a further inverse azimuth FFT unit 8, the output of which gives a focussed SAR image 9.

As described above, the sequence of the focussing algorithm chosen is not fundamentally impaired by the method according to the invention; the only condition is that the range compression must not be performed previously. The method according to the invention can be implemented both in hardware and in software.

The total number of the Fourier transformations, requiring a great deal of computing time, is equal to that in known methods; however, the interpolation is dispensed with. The image quality achieved is however better in particular because the method according to the invention corresponds to an interpolation with an interpolation kernel of the length of a range chirp usually corresponding to 700 sample values.

A requirement for application of the method according to the invention is that within each processing block which is defined by the range and azimuth FFT lengths, an unambiguous relationship between frequency f and range migration correction exists. This is the case whenever the socalled Doppler centroid frequency variation of the data over range is not greater than the difference between the PRF (pulse repetition frequency) and the PBW (processing bandwidth) of the Doppler bandwidth used for the azimuth focussing.

In the case of an L band SAR, such as SEASAT, the entire range swath can be processed at once. For higher frequency SAR sensors it may be necessary to divide the range swath into several segments. On the other hand, these segments should not be smaller than the length $\tau_p$ of the range chirp. If that is nevertheless the case, the range chirp can be shortened in time by a range precompression. To shorten the range chirp to the duration $\tau_{p,new}$ a correlation has to be carried out with a chirp of the FM rate $$k_{precompression} = \frac{k}{1 - \frac{\tau_{p,new}}{\tau_p}} \qquad (23)$$

With the aid of the method according to the invention the "Stolt interpolation" as is necessary in the exact implementation of the wavenumber domain processor is implicitly performed with high accuracy.

We claim:

1. A method of correcting range migration in image generation in synthetic aperture radar SAR for eliminating the entire range migration, which in the range-Doppler domain is described by $$\Delta \tau = a(f) \cdot \frac{2}{c} \cdot r$$

wherein $\Delta \tau$ is the desired echo time shift, r the minimum distance of a point from the radar and f the azimuth (Doppler) frequency, or for eliminating a residual range migration, which is left by a focussing means, is described by $$\Delta \tau = a(f) \cdot \left( \frac{2}{c} \cdot r - \tau' \right)$$

wherein $\tau'$ is any desired reference echo time, and for carrying out a Stolt interpolation respectively; before performing a range compression, acquire SAR raw data which is to be transformed, in an azimuth FFT unit, to the range-Doppler domain; thereafter multiply, in a first multiplying unit, said data transformed to the range-Doppler domain by a two-functional phase function $$\exp\{j \cdot \pi \cdot k \cdot a(f) \cdot (\tau - \tau')^2\}$$

wherein k is the frequency modulation rate of a chirp pulse transmitted by the radar and $\tau$ the echo travelling time; performing range Fourier transformation on the data from said first multiplying unit; a range compression is carried out in a second multiplying unit by multiplying an output of said range Fourier transformation with a modified range transfer function $$\exp\left( j \cdot \pi \cdot \frac{1}{1 + a(f)} \cdot \frac{v^2}{k} \right)$$

wherein $v$ is the range frequency corresponding to the echo travelling time $\tau$; using an inverse range FFT unit, transform output data of said second multiplying unit back to the range-Doppler domain; and correct phase error, by using a third multiplying unit, to multiply output data from said inverse range FFT unit with a function $$\exp\{-j \cdot \pi \cdot a(f) \cdot (1+a(f)) \cdot k \cdot (\tau-\tau')^2\}.$$

2. A method according to claim 1, wherein prior to a transformation of the raw data determined to the range-Doppler domain a segmenting is carried out in range with adequately large overlapping regions.

3. A method according to claim 2, wherein prior to a transformation of the raw data determined into a range-Doppler domain, the new raw data are correlated for shortening the range chirp length ($\tau_p$ to $\tau_{p,new}$) with a chirp having a corresponding FM rate $$k_{precompression} = \frac{1}{1 - \frac{\tau_{p,new}}{\tau_p}}.$$

* * * * *